US012617435B2

(12) United States Patent
Mathes et al.

(10) Patent No.: US 12,617,435 B2
(45) Date of Patent: May 5, 2026

(54) METHOD FOR BEHAVIOR PLANNING OF AN EGO VEHICLE AS PART OF A TRAFFIC SCENE

(71) Applicant: Robert Bosch GmbH, Stuttgart (DE)

(72) Inventors: Juergen Mathes, Stuttgart-Moehringen (DE); Markus Mazzola, Tuebingen (DE); Martin Stoll, Renningen (DE); Maxim Dolgov, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 18/441,846

(22) Filed: Feb. 14, 2024

(65) Prior Publication Data

US 2024/0278808 A1     Aug. 22, 2024

(30) Foreign Application Priority Data

Feb. 22, 2023     (DE) ..................... 10 2023 201 580.3

(51) Int. Cl.
B60W 60/00     (2020.01)
G01C 21/34     (2006.01)

(52) U.S. Cl.
CPC ..... B60W 60/0027 (2020.02); G01C 21/3492 (2013.01)

(58) Field of Classification Search
CPC .. B60W 60/0027; B60W 30/10; B60W 40/04; B60W 2554/4049; B60W 50/0097; B60W 50/0098; B60W 60/001; B60W 60/0017; B60W 2050/0043; B60W 2554/80; G01C 21/3492
See application file for complete search history.

(56) References Cited

U.S. PATENT DOCUMENTS

| | | | |
|---|---|---|---|
| 11,126,180 B1 * | 9/2021 | Kobilarov | ....... B60W 30/18163 |
| 11,763,485 B1 * | 9/2023 | Chen | ......................... G06T 7/73 |
| | | | 382/103 |
| 11,834,077 B2 * | 12/2023 | Sadeghi | .............. B60W 30/095 |
| 12,397,780 B2 * | 8/2025 | Beller | ....................... G06T 7/20 |

(Continued)

OTHER PUBLICATIONS

Mahjuourian et al., "Occupancy Flow Fields for Motion Forecasting in Autonomous Driving", Mar. 8, 2022 (8 pages).

(Continued)

*Primary Examiner* — Anne Marie Antonucci
*Assistant Examiner* — Jordan T Smith
(74) *Attorney, Agent, or Firm* — Maginot, Moore & Beck LLP

(57)     ABSTRACT

A computer-implemented method is for planning the behavior of an ego vehicle as part of a traffic scene. The ego vehicle is equipped with an in-vehicle sensor system whose visual range is influenced by a respective current traffic scene. The method includes generating a scene representation of the current traffic scene using scene-specific sensor data captured by the in-vehicle sensor system, and predicting a future development of the traffic scene based on the generated scene representation. The method further includes planning driving maneuvers taking into account the prediction of the future development of the traffic scene. The method predicts the effects of the future development of the traffic scene on the visual range of the in-vehicle sensor system.

9 Claims, 5 Drawing Sheets

(56)  References Cited

U.S. PATENT DOCUMENTS

| | | | | |
|---|---|---|---|---|
| 2007/0043491 | A1* | 2/2007 | Goerick | G06V 20/58 |
| | | | | 701/41 |
| 2008/0300733 | A1* | 12/2008 | Rasshofer | G08G 1/0133 |
| | | | | 701/1 |
| 2016/0062361 | A1* | 3/2016 | Nakano | G05D 1/0088 |
| | | | | 701/25 |
| 2016/0327953 | A1* | 11/2016 | Nilsson | B60W 50/0097 |
| 2019/0180502 | A1* | 6/2019 | Englard | G01S 7/40 |
| 2021/0064890 | A1* | 3/2021 | Murveit | G05D 1/0212 |
| 2021/0341920 | A1* | 11/2021 | Singh | G06N 3/088 |
| 2022/0317694 | A1* | 10/2022 | Di Cairano | G05D 1/617 |
| 2023/0056589 | A1* | 2/2023 | Trojahner | B60W 60/0016 |
| 2023/0230484 | A1* | 7/2023 | Al Faruque | G06V 20/56 |

OTHER PUBLICATIONS

Sadat et al., "Perceive, Predict, and Plan: Safe Motion Planning Through Interpretable Semantic Representations", Aug. 13, 2020 (28 pages).
Casas et al., "MP3: A Unified Model to Map, Perceive, Predict and Plan", Jan. 18, 2021 (22 pages).
Bansal et al., "ChauffeurNet: Learning to Drive by Imitating the Best and Synthesizing the Worst", Dec. 7, 2018 (20 pages).

\* cited by examiner

METHOD FOR BEHAVIOR PLANNING OF AN EGO VEHICLE AS PART OF A TRAFFIC SCENE

This application claims priority under 35 U.S.C. § 119 to patent application no. DE 10 2023 201 580.3, filed on Feb. 22, 2023 in Germany, the disclosure of which is incorporated herein by reference in its entirety.

The disclosure relates to a computer-implemented method for behavior planning of an ego vehicle as part of a traffic scene. Furthermore, the disclosure relates to a computer-implemented system for this purpose.

BACKGROUND

Deep learning (DL)-based prediction and planning approaches often use occupancy maps as intermediate representations within a model to compute planning trajectories or predicted trajectories.

However, such approaches ignore the fact that the areas that can be viewed by the sensors of the automated driving (AD) vehicle are limited. This manifests itself in an increasing uncertainty of the predicted occupancy over time. However, it is not resolved whether the uncertainty increases because the expectation of the movement of a vehicle is uncertain, or whether it increases because the area in front of a vehicle is not visible and therefore unsafe.

SUMMARY

Features and details that are described in connection with the method according to the disclosure naturally also apply in connection with the system according to the disclosure, and vice versa, so that reference is or can always be made to the individual aspects of the disclosure with respect to the disclosure.

The object of the disclosure is, in particular, a computer-implemented method for planning the behavior of an ego vehicle as part of a traffic scene. The ego vehicle can be equipped with an in-vehicle sensor system whose visual range is influenced by the current traffic scene. The method may comprise at least the following method steps, which are preferably carried out successively and/or repeatedly:

generating a scene representation of the current traffic scene using scene-specific sensor data, which has been recorded in particular with the help of the in-vehicle sensor system, predicting a future development of the traffic scene on the basis of the scene representation, hereinafter also referred to as prediction, and planning of driving maneuvers taking into account the prediction of the future development of the traffic scene, hereinafter also referred to as planning for short.

According to the disclosure, it is envisaged that the effects of the future development of the traffic scene on the visual range of the in-vehicle sensor system are predicted as part of the prediction. This makes it possible to plan the driving maneuver based on the prediction, even taking into account a change in the future visual range of the in-vehicle sensor system. In this way, the effect of the future development of the traffic scene on the visual range can act as an additional source of information for the prediction, which significantly improves the quality of the prediction.

Advantageously, other scene-specific information is also aggregated and used to generate the scene representation, e.g., map information, GPS data, weather data and the like.

This makes it possible to reliably plan driving maneuvers for the current traffic scene based on the scene representation.

It is also conceivable that the prediction is made using a machine learning model. The machine learning model may comprise at least or exactly one artificial neural network trained for this purpose, preferably a convolutional neural network (CNN).

The scene-specific sensor data can be recorded, for example, by at least one sensor of the in-vehicle sensor system, such as a camera and/or a LIDAR sensor and/or a radar sensor and/or an ultrasonic sensor, detecting the surroundings of the ego vehicle.

It is also conceivable that information about the current and/or future visual range of the in-vehicle sensor system could be taken into account during planning. It is possible that the visual range of the in-vehicle sensor system is temporarily reduced due to an area of the surroundings being obscured by at least one object in the surroundings and/or by other influencing factors. It is then possible that other objects cannot be detected immediately due to the reduction in the visual range. This is where the method according to the disclosure creates an improvement, as such uncertainty can be taken into account by changing the visual range when planning driving maneuvers.

In addition, it may be provided that a probability distribution of the location, orientation and/or dimensioning within the traffic scene is determined as part of the scene representation using the recorded sensor data for at least one road user and/or at least one object in the traffic scene. This makes it possible to base the planning of driving maneuvers on a wide range of information.

It is also conceivable that at least one occupancy model is generated as part of the scene representation using the recorded sensor data, wherein the occupancy model represents a mapping of the traffic scene to a contiguous arrangement of cells and indicates for each of these cells a measure of whether this cell is occupied by a road user and/or an object of the traffic scene, or whether the occupancy is unknown. Additional information, such as map information, can also be used to generate the occupancy model. The cells can, but do not have to be the same size. One example of an occupancy model with uniform cells is the occupancy grid.

One way to generate an occupancy model can be to represent a map of the mapped surroundings as a uniformly distributed array of binary random variables, each of which represents the presence of an obstacle at that location in the surroundings. Preferably, algorithms for occupancy grids can calculate approximate posterior estimates for these random variables. The method is also known as "occupancy grid mapping".

Furthermore, it is possible that at least one visual range model is generated as part of the representation using the recorded sensor data, wherein the visual range model represents a mapping of the traffic scene to a contiguous arrangement of areas and indicates a probability for each of these areas as to whether this area can be seen by the in-vehicle sensor system. Additional information such as map information can also be used to generate the visibility model. One example of a visual range model is the visibility grid.

It is possible for the prediction of the occupancy model to be recurrent and for the recurrent prediction of the occupancy model to take into account the visual range model of at least one previous point in time. It is also conceivable that the prediction of the visual range model is recurrent and that the recurrent prediction of the visual range model takes into account the occupancy model of at least one previous point in time. In this way, the advantage can be achieved that the occupancy from a past point in time is added as input for the prediction of the effect on the visual range in order to take into account the traffic scene such as a constellation of objects in the surroundings, e.g., on the road.

When generating the representation, it is also possible to take into account attention information that allows sub-areas of the traffic scene to be weighted. For this purpose, example, a machine learning model for prediction is supplemented with at least one or more attention blocks. This makes it possible to focus computing operations on relevant sub-areas, which results in shorter latencies. In addition, decisions based on prediction become more transparent and comprehensible.

In addition, it is possible to compare the attention information with information about the current and/or future visual range of the in-vehicle sensor system and to take into account deviations between sub-areas of the traffic scene that have been identified as relevant for planning on the basis of the attention information and the current and/or future visual range of the in-vehicle sensor system when planning driving maneuvers.

According to a further possibility, it can be provided that in the event of deviations between the planning-relevant sub-areas of the traffic scene and the current and/or future visual range of the in-vehicle sensor system, at least one safety mechanism is activated and/or at least one driving maneuver is planned in such a way that the visual range of the in-vehicle sensor system is aligned with at least one planning-relevant sub-area. The driving maneuver can be planned, for example, by generating at least one trajectory, preferably a planning trajectory, and/or generating further output such as (in particular future) location probabilities of the traffic scene. Such outputs can, for example, enable safe and reliable automated driving.

Another object of the disclosure is a computer-implemented system for behavior planning of an ego vehicle as part of a traffic scene, wherein the ego vehicle is equipped with an in-vehicle sensor system whose visual range is influenced by the current traffic scene. The system according to the disclosure can at least comprise:

- a first stage for generating a scene representation of the current traffic scene using scene-specific sensor data recorded by an in-vehicle sensor system,
- a second stage for predicting the future development of the traffic scene on the basis of scene representation and
- a third stage for planning driving maneuvers, taking into account the prediction of the future development of the traffic scene.

It is intended that the second stage is designed to predict the effects of the future development of the traffic scene on the visual range of the in-vehicle sensor system, and that the third stage is designed to take information about the current and/or future visual range of the in-vehicle sensor system into account when planning driving maneuvers. The system according to the disclosure thus has the same advantages as those described in detail with reference to a method according to the disclosure.

It is also possible that the first stage is designed to take into account attention information for weighting sub-areas of the traffic scene when generating the scene representation. This allows for safer and more reliable planning.

It is also conceivable that the third stage is designed to take into account deviations between the sub-areas of the traffic scene that have been identified as relevant for planning based on the attention information and the current and/or future visual range of the in-vehicle sensor system when planning driving maneuvers.

The planned driving maneuver can preferably be used for automated driving. The ego vehicle can be controlled automatically, i.e., also partially automated and/or fully autonomously, based on the at least one planned driving maneuver. Accordingly, it is possible for the method according to the disclosure to be used in an autonomous vehicle (AD vehicle). The vehicle can, for example, be designed as a motor vehicle and/or passenger vehicle. The vehicle can have a vehicle device, e.g., for providing the autonomous driving function and/or a driver assistance system. The vehicle device can be designed to steer and/or accelerate and/or brake and/or steer the vehicle at least partially automatically, preferably in accordance with the planned driving maneuver.

BRIEF DESCRIPTION OF THE DRAWINGS

Further advantages, features, and details of the disclosure will emerge from the following description, in which exemplary embodiments of the disclosure are described in detail with reference to the drawings. In this context, the features specified in the claims and in the description can each be essential to the disclosure individually or in any combination.

DETAILED DESCRIPTION

Figure 1:
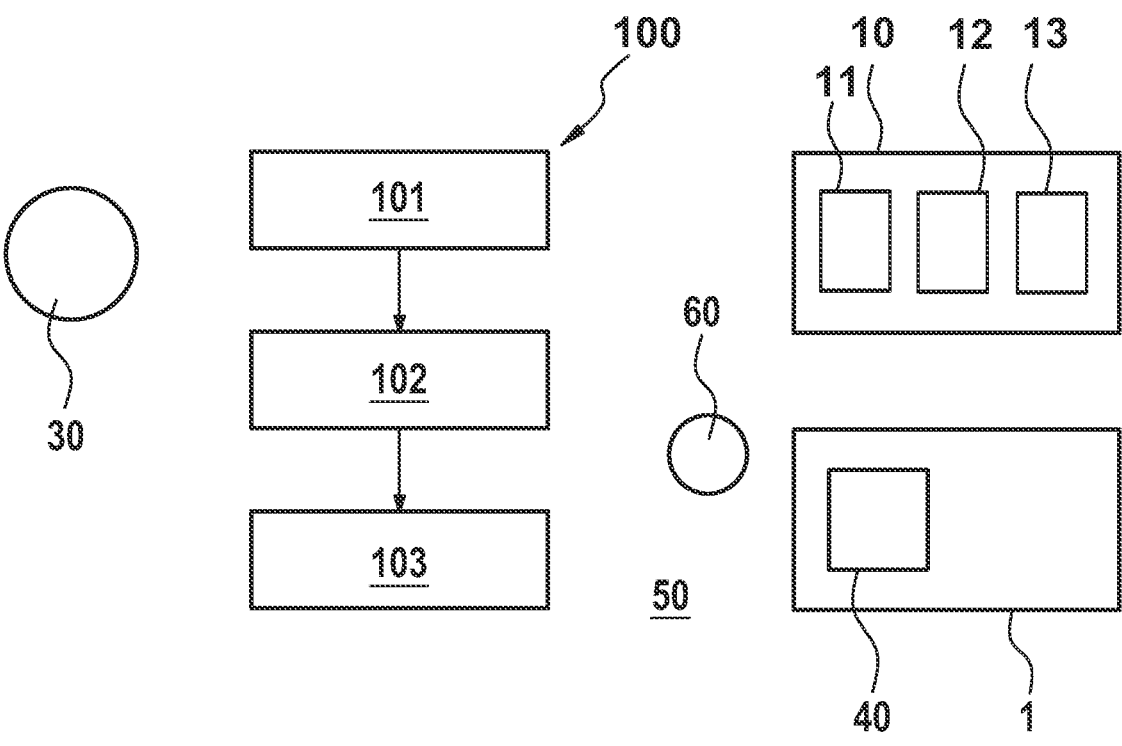
FIG. 1 is a schematic visualization of a method and a system according to exemplary embodiments of the disclosure.

In the drawings, identical reference signs are used for identical technical features, even in different exemplary embodiments.

FIG. 1 shows a computer-implemented method 100 according to exemplary embodiments of the disclosure for behavior planning of an ego vehicle 1 as part of a traffic scene. The ego vehicle 1 can be equipped with an in-vehicle sensor system 40. Such a sensor system 40 can, for example, have at least one camera and/or a lidar sensor and/or a radar sensor and/or the like. The sensor system 40 enables the surroundings 50 of the ego vehicle 1 to be detected. However, the visual range of the sensor system 40 can be influenced by the current traffic scene. In particular, this means that the visibility of the sensor system 40 may be reduced by objects 60 in the surroundings 50, such as other road users, while the ego vehicle 1 is moving.

According to a first method step 101, a scene representation of the current traffic scene can be generated using scene-specific sensor data. This can be carried out using known algorithms in which the sensor data is evaluated in order to detect objects 60 and/or a roadway and/or obstacles and/or their distances. The sensor data may have been recorded completely or at least partially with the aid of the in-vehicle sensor system 40. Accordingly, the sensor data can comprise, for example, image data that has been created by recording the surroundings 50.

Furthermore, according to a second method step 102, a future development of the traffic scene can be predicted on the basis of the scene representation. This can be understood to mean that a prediction for a future traffic situation is made from the current traffic situation for which the scene representation is specific. For example, a model 30 such as a neural network can be used for this purpose.

Subsequently, according to a third method step 103, driving maneuvers can be planned taking into account the prediction of the future development of the traffic scene. For this purpose, for example, a trajectory is determined on the basis of an output of the model 30, along which a movement of the ego vehicle 1 can be planned and executed. In this way, for example, the movement of the ego vehicle 1 can take into account when another road user changes lanes and/or may represent an obstacle in the future.

It is also intended that the prediction process will predict the effects of future developments in the traffic scene on the visual range of the in-vehicle sensor system 40. In other words, the driving maneuvers can be planned and, if necessary, executed not only taking into account the future development of the traffic scene, but also taking into account its effects on the visibility of the sensor system 40. In this way, it can be taken into account, for example, that another road user may be obscured by an object 60, which is currently still unknown (unknown occupancy), but may then represent an obstacle for the ego vehicle 1 in future development.

A computer-implemented system 10 is also shown schematically in FIG. 1. The system 10 can be used to plan the behavior of the ego vehicle 1 as part of the traffic scene. For this purpose, the system 10 is permanently integrated into the ego vehicle 1, for example in the form of vehicle electronics. The system 10 can comprise a first stage 11, which is designed to generate a scene representation of the current traffic scene using scene-specific sensor data captured by an in-vehicle sensor system 40. Furthermore, a second stage 12 can be provided for predicting the future development of the traffic scene on the basis of the scene representation. A third stage 13 of the system 10 can also be used to plan driving maneuvers taking into account the prediction of the future development of the traffic scene. The second stage 12 can be designed to predict the effects of the future development of the traffic scene on the visual range of the in-vehicle sensor system 40. In addition, the third stage can be designed to take into account information about the current and/or future visual range of the in-vehicle sensor system 40 when planning driving maneuvers.

Figure 2A:
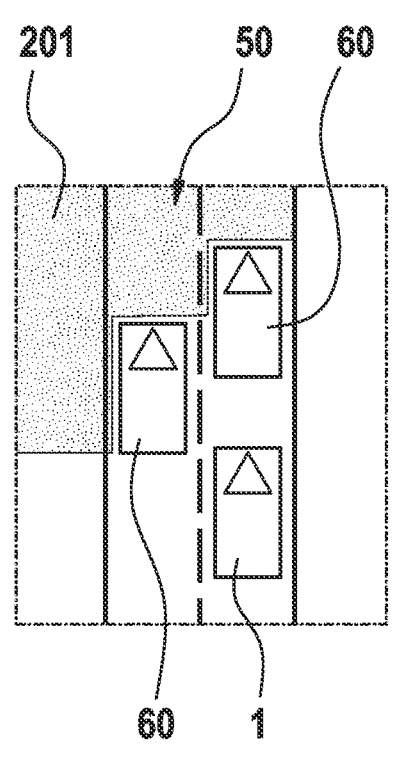
FIG. 2A is a schematic representation of the surroundings.
Figure 2B:
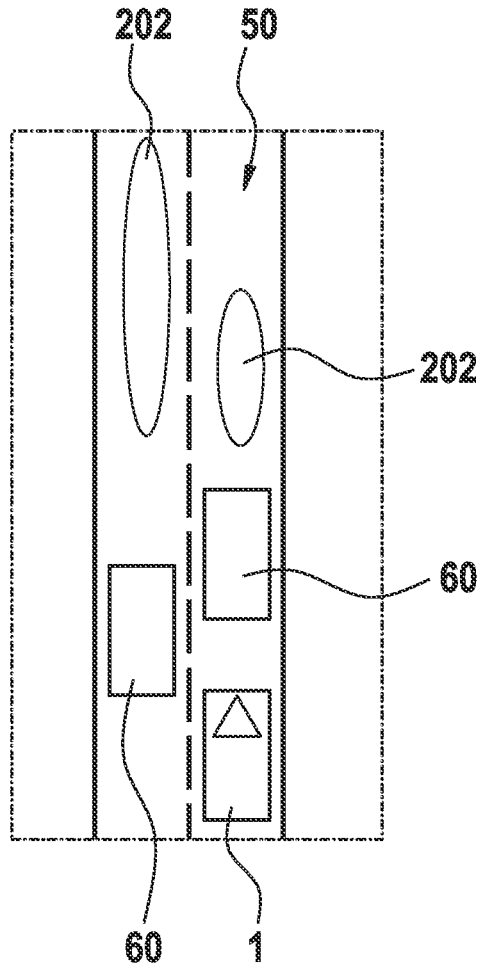
FIG. 2B is a schematic representation of the surroundings, FIG. 3 a schematic visualization of a method according to exemplary embodiments of the disclosure.

In the following, the application of the described method 100 and system 10 will be illustrated according to further exemplary embodiments. FIG. 2A shows a driving situation in which the ego vehicle 1, preferably in the form of an AD vehicle 1, cannot perceive what is in front of the two objects 60 in the form of traffic vehicles 60. This is visualized by the non-visible area 201. In order to plan a driving maneuver in such a situation, at least one occupancy model can be generated as part of the scene representation using the acquired sensor data, wherein the occupancy model can represent a mapping of the traffic scene to a contiguous arrangement of cells and can indicate for each of these cells a measure of whether this cell is occupied by a road user 60 and/or an object 60 of the traffic scene, or whether the occupancy is unknown. Specifically, for example, an occupancy map can be predicted as an occupancy model. FIG. 2B shows a prediction of such an occupancy map for the two traffic vehicles 60 after 3 seconds. Here, the uncertainty 202 is very high, especially for the left-hand traffic vehicle 60, because its speed is higher than that of the traffic vehicle 60 in front of vehicle 1. Since the prediction model usually cannot distinguish whether a traffic vehicle 60 can continue driving just as fast or has to slow down because there is another vehicle 60 in front of it, it is forced to marginalize and the occupancy becomes blurred—i.e., increasingly uncertain. This uncertainty is visualized for the respective traffic vehicle 60 by the areas 202.

Figure 3:
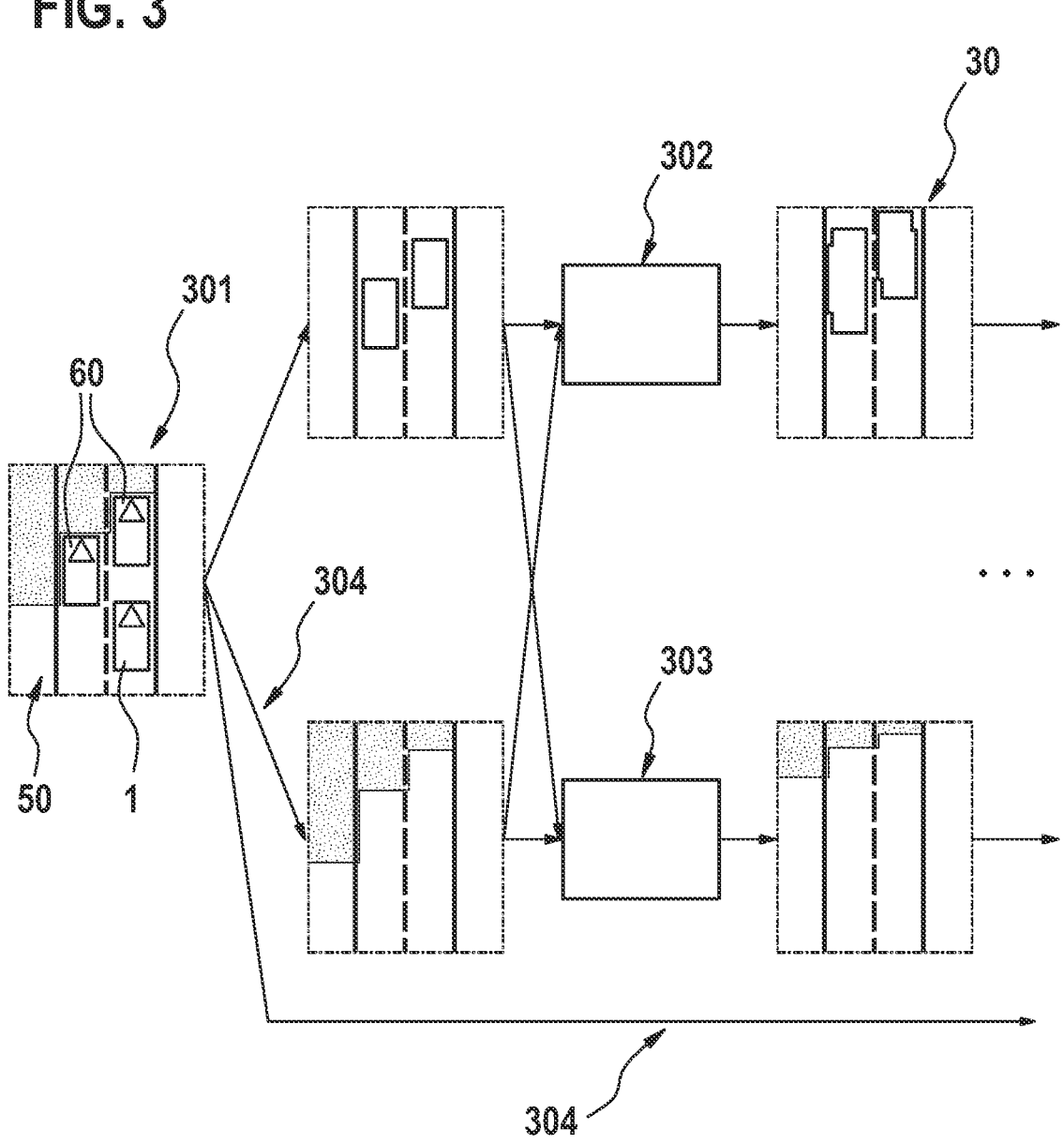

According to exemplary embodiments of the disclosure, models 30 such as deep learning (DL) models for prediction and planning can, in addition to occupancy maps or occupancy flows (e.g., as grids), additionally model and predict the visual range, also referred to as visibility or field of view, as a grid. The visual range can thus function as an additional input 304 and thus as an additional source of information in a recurrent prediction of the occupancy, which improves the quality of the prediction. On the other hand, the occupancy from a previous point in time can be used as input for the prediction of the visual range, as the visual range also depends on the constellation of objects 60 on the road. A possible embodiment of such a system 30 is shown schematically in FIG. 3. The input data for the model 30, in particular machine learning model 30, are identified by 301, the occupancy prediction by 302 and the visual range prediction of the model 30 by 303. Furthermore, FIG. 3 visualizes a possible integration of a visual range prediction into a prediction of the occupancy map. The roadway is only shown schematically in the predicted grids. With the described approach, known architectures can be extended to consider the visual range. This additional information channel can enable a hardware and/or software component such as an AD planner for autonomous driving, to plan maneuvers that explicitly take the visual range into account without this being explicitly required in the planning task.

Figure 4B:
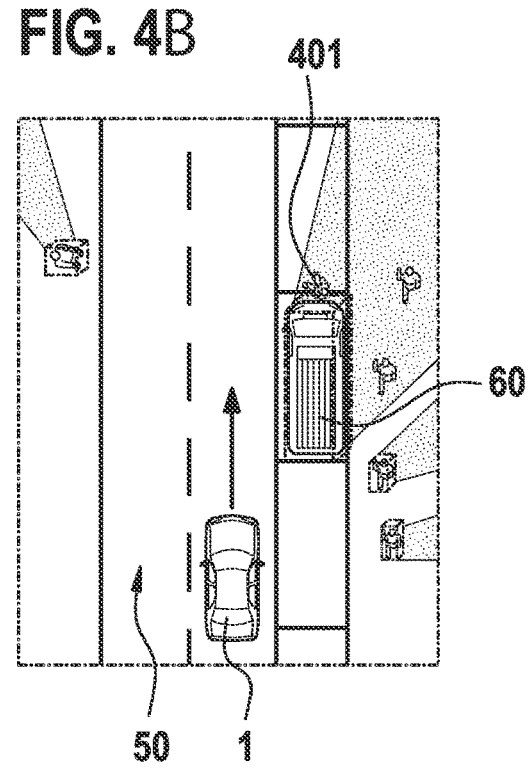
FIG. 4B is a schematic visualization of driving situations during autonomous driving.
Figure 4A:
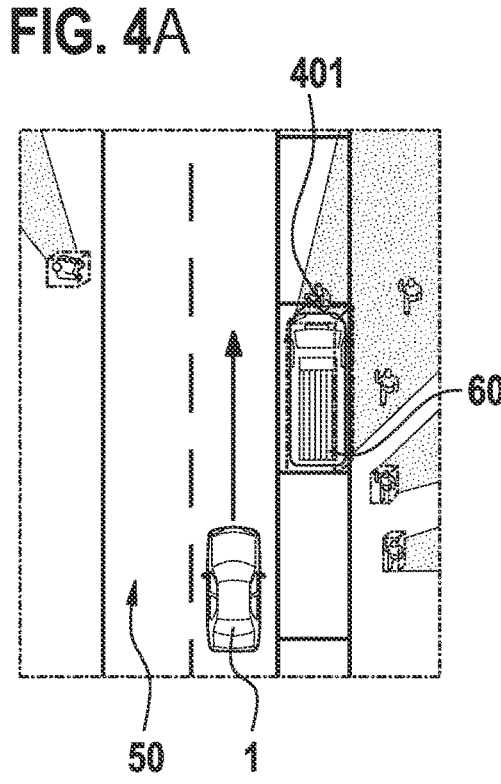
FIG. 4A is a schematic visualization of driving situations during autonomous driving.
Figure 4C:
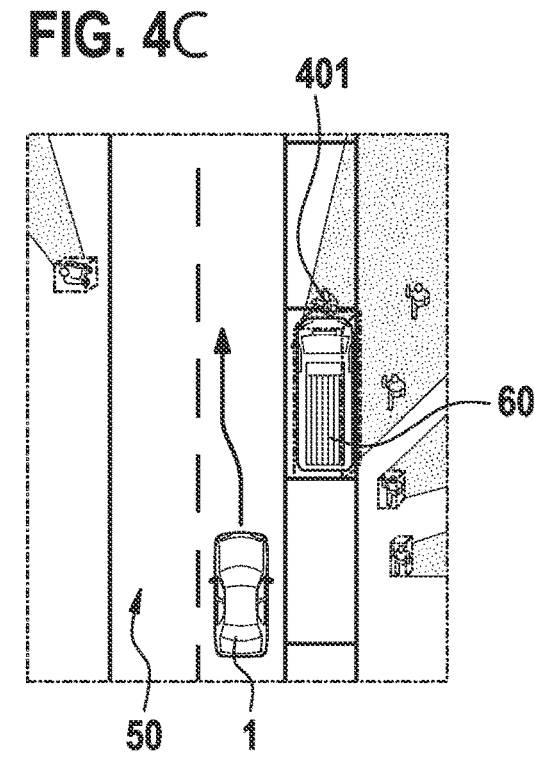
FIG. 4C is a schematic visualization of driving situations during autonomous driving, and FIG. 5 a schematic visualization of a machine learning model.

While conventional DL approaches do not explicitly consider the visual range and would presumably plan the maneuver in FIG. 4A (which ignores occlusion), an AD planner that explicitly receives the visual range information can explicitly distinguish the two cases shown in FIG. 4B and FIG. 4C: In FIG. 4B, a slow drive past an obscuring delivery truck 60 is provided in order to be able to react in good time to a potential pedestrian 401 in the obscured area in front of the delivery truck 60. In FIG. 4C, it may be intended to pass the delivery truck 60, which is obscured from view, at a greater distance in order to be able to recognize the pedestrian 401 earlier and also not have to react directly to the pedestrian 401 due to the greater distance.

Common data-based methods for behavior planning, in particular trajectory planning, for automated driving determine a plan trajectory from detected objects and the road map. Alternative approaches combine perception and planning and work with sensor data, e.g., point clouds. Hoods play an important role in many real driving situations, see e.g., FIGS. 2A, 2B, 4A, 4B, and 4C. In existing approaches, they are only handled implicitly, i.e., the correct behavior is taught using large amounts of data.

The starting point of the method 100 according to exemplary embodiments of the disclosure may be recognized objects 60 and map information, which are rasterized into semantically different color channels and serve as input to a neural network 30. The output is a plant trajectory, which is then regulated. An extension for data-based planning methods can be provided, which on the one hand can directly utilize information about the visible area and on the other hand allows explicit conclusions to be drawn about which areas are relevant for decision-making.

According to exemplary embodiments of the disclosure, grid-based planners can be extended by an additional input channel that describes the visual range of the sensor system. This enables the model 30 to distinguish between open areas (no objects 60 in the visual range) and areas that are not visible. This has several advantages: Fewer sensor characteristics are implicitly learned and the model 30 can be better applied to new sensor configurations (with a different field of view). It is also easier to combine training data from different sensor configurations. New augmentations are also possible, which extend the training data set, e.g., subsequent reduction of the visual range and removal of the detections within this area (degradation).

Figure 5:
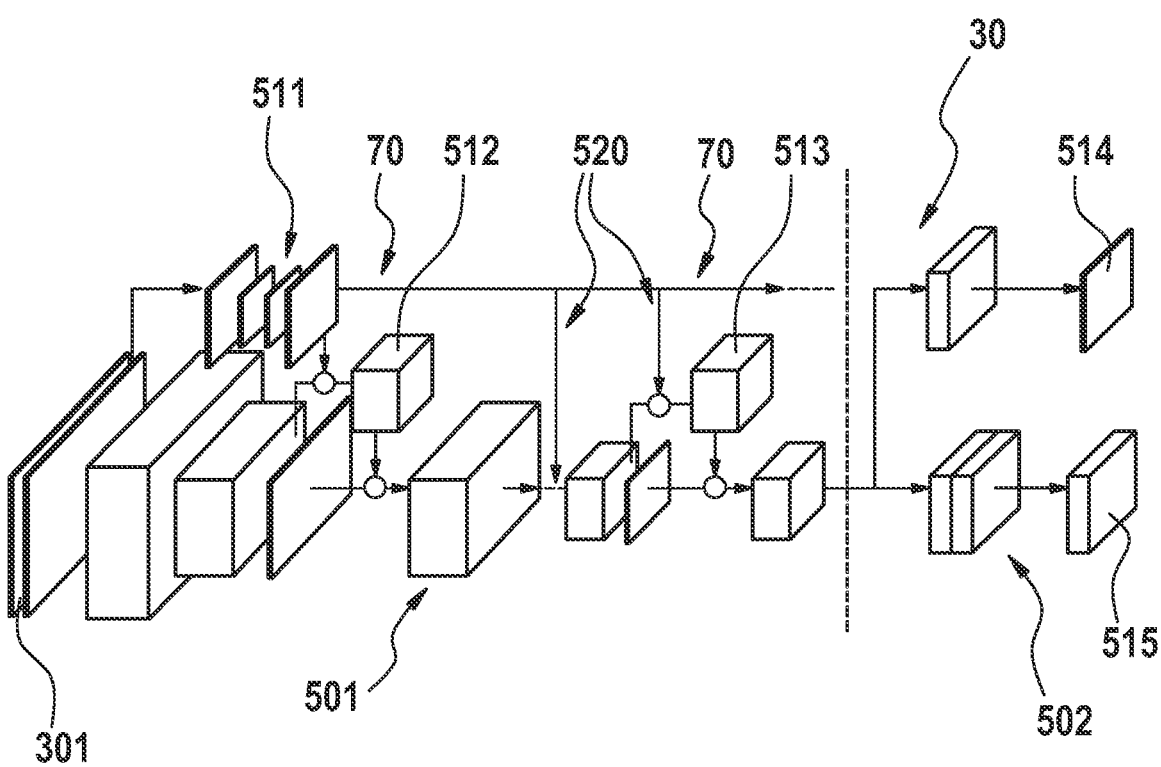

Another aspect of exemplary embodiments of the disclosure is the use of attention blocks 70. This makes it possible to take into account attention information when generating the representation, which allows sub-areas of the traffic scene to be weighted. It is shown in FIG. 5 that the model 30 can comprise at least one or more attention blocks 70 for this purpose. An explicit mask is generated here that determines which sub-areas and preferably image areas and/or areas in the occupancy grid are important for the driving task. These sub-areas are then processed more intensively. The focus is on dynamic objects, which improves the prediction of relevant objects (at the expense of less relevant objects). Attention focuses the computing operations on relevant sub-areas, which results in shorter latencies. In addition, the decisions of model 30 become more transparent and comprehensible. Another major advantage is that it is possible to compare attention and visual range: If attention is located in non-visible areas, the driving behavior is strongly influenced by occlusions. In this case, additional security mechanisms can be activated.

In FIG. 5, in addition to the model 30 in the form of a CNN, the attention blocks 70 and an input 301, the CNN backbone 501 and the output headers 502 are also visualized. Finally, the attention information can be used explicitly in planning, for example by looking specifically at non-visible areas through the variation of your own maneuver if this area appears relevant according to the attention mask. For example, when approaching a junction with an obscured view, you can deliberately keep as far left as possible in the lane in order to increase visibility to the right, because attention is extended in this direction. The additional input "visual range" can be rasterized directly from the perception output and is concatenated to the other channels. The information can be binary or transport uncertainty via a continuous spectrum. An "Attention Generator" can generate a pixel mask from the input data. Additional architecture blocks that are inserted into the existing architecture may only process those pixels that were determined by the attention mask. The attention mask can optionally also be used to crop the map information. This identifies relevant areas that are independent of the current traffic situation.

FIG. 5 also shows further details of an exemplary network configuration. An "Attention Generator" 511, two Res-Blocks 512, 513 and the downsampling 520 are shown. A "Perception & Prediction" output 514 and a "Planning Cost Volume" output 515 are also shown as the output of the output headers 502.

The explanation hereinabove of the embodiments describes the disclosure solely within the scope of examples. Of course, individual features of the embodiments can be freely combined with one another, if technically feasible, without leaving the scope of the disclosure.

What is claimed is:

1. A computer-implemented method for planning a behavior of an ego vehicle as part of a traffic scene, the ego vehicle equipped with an in-vehicle sensor system whose visual range is influenced by a respective current traffic scene, the method comprising:

generating a scene representation of a current traffic scene using scene-specific sensor data captured by the in-vehicle sensor system, the generation of the scene representation based on attention information that weights individual sub-areas of a plurality of sub-areas of the current traffic scene, the attention information used to focus computing operations on relevant sub-areas of the plurality of sub-areas of the current traffic scene;

predicting a future development of the current traffic scene based on the generated scene representation including predicting effects of the future development of the current traffic scene on the visual range of the in-vehicle sensor system;

planning driving maneuvers of the ego vehicle based on the prediction of the future development of the traffic scene; and moving the ego vehicle through the traffic scene according to the planned driving maneuvers, wherein the attention information is compared with information about a current visual range and/or a future visual range of the in-vehicle sensor system, and wherein the driving maneuvers are planned further based on deviations between (i) the relevant sub-areas of the current traffic scene according to the attention information, and (ii) the current visual range and/or the future visual range of the in-vehicle sensor system.

2. The method according to claim 1, further comprising:

determining a probability distribution of a location, orientation, and/or dimensioning within the current traffic scene as part of the generated scene representation using the captured scene-specific sensor data for at least one road user and/or at least one object of the current traffic scene.

3. The method according to claim 1, further comprising:

generating at least one occupancy model as a part of the generated scene representation using the captured sensor data, the occupancy model representing a mapping of the current traffic scene to a contiguous arrangement of cells and indicating for each of the cells a measure of whether a respective cell is occupied by a road user and/or an object of the current traffic scene, or whether occupancy of the respective cell is unknown.

4. The method according to claim 3, further comprising:

generating at least one visual range model as a part of the generated scene representation using the captured sensor data, the at least one visual range model representing a mapping of the current traffic scene to a contiguous arrangement of areas and indicating for each of the areas a probability of whether a respective area is seen by the in-vehicle sensor system.

5. The method according to claim 4, wherein the generation of the at least one occupancy model is performed recurrently and the recurrent generation of the at least one occupancy model is based on the at least one visual range model of at least one preceding time point.

6. The method according to claim 4, wherein the generation of the at least one visual range model is recurrent and the recurrent generation of the at least one visual range model is based on the at least one occupancy model of at least one preceding instant.

7. The method according to claim 1, wherein, when deviations occur between planning-relevant sub-areas of the traffic scene and the current visual range and/or the future visual range of the in-vehicle sensor system, at least one safety mechanism is activated and/or at least one driving maneuver is planned such that the visual range of the in-vehicle sensor system is aligned with at least one planning-relevant sub-area.

8. The method according to claim 1, wherein the driving maneuvers are planned, such that in response to the deviations, the ego vehicle is moved through the traffic scene in a corresponding direction to increase the current visual range and/or the future visual range of the in-vehicle sensor system with respect to a particular sub-area of the current traffic scene, the particular sub-area having been identified as relevant for planning the driving maneuvers based on the attention information.

9. A computer-implemented system for behavior planning of an ego vehicle as part of a traffic scene, the ego vehicle equipped with an in-vehicle sensor system whose visual range is influenced by a respective current traffic scene, the system comprising:

a controller configured (i) to generate a scene representation of the current traffic scene using scene-specific sensor data acquired by an in-vehicle sensor system, the generation of the scene representation based on attention information that weights individual sub-areas of a plurality of sub-areas of the current traffic scene, the attention information used to focus computing operations on relevant sub-areas of the plurality of sub-areas of the current traffic scene, (ii) to predict a future development of the traffic scene based on the scene representation, (iii) to plan driving maneuvers based on the prediction of the future development of the traffic scene, and (iv) to move the ego vehicle through the traffic scene according to the planned driving maneuvers, wherein the attention information is compared with information about a current visual range and/or a future visual range of the in-vehicle sensor system, and wherein the controller is further configured to plan the driving maneuvers further based on deviations between (i) relevant sub-areas of the current traffic scene according to the attention information, and (ii) the current visual range and/or the future visual range of the in-vehicle sensor system.

* * * * *